(12) United States Patent
Roscoe et al.

(10) Patent No.: US 12,437,123 B2
(45) Date of Patent: Oct. 7, 2025

(54) DATA INTERCEPTION PROTECTION

(71) Applicant: BRITISH TELECOMMUNICATIONS PUBLIC LIMITED COMPANY, London (GB)

(72) Inventors: Jonathan Roscoe, London (GB); Max Smith-Creasey, London (GB)

(73) Assignee: British Telecommunications Public Limited Company, London (GB)

( * ) Notice: Subject to any disclaimer, the term of this patent is extended or adjusted under 35 U.S.C. 154(b) by 312 days.

(21) Appl. No.: 17/905,543

(22) PCT Filed: Feb. 23, 2021

(86) PCT No.: PCT/EP2021/054386
§ 371 (c)(1),
(2) Date: Sep. 2, 2022

(87) PCT Pub. No.: WO2021/175647
PCT Pub. Date: Sep. 10, 2021

(65) Prior Publication Data
US 2023/0118093 A1  Apr. 20, 2023

(30) Foreign Application Priority Data
Mar. 6, 2020  (EP) ...................... 2003349

(51) Int. Cl.
*G06F 21/83* (2013.01)
*G06F 3/01* (2006.01)
(Continued)

(52) U.S. Cl.
CPC ............. *G06F 21/83* (2013.01); *G06F 3/016* (2013.01); *G06F 3/04886* (2013.01); *G06F 21/60* (2013.01)

(58) Field of Classification Search
CPC ...... G06F 21/83; G06F 3/016; G06F 3/04886; G06F 21/60
See application file for complete search history.

(56) References Cited

U.S. PATENT DOCUMENTS 8,667,414 B2   3/2014   Zhai et al.
10,504,340 B2 * 12/2019   Moussette ............. G06F 3/0488
(Continued)

FOREIGN PATENT DOCUMENTS

AU   2020203587 B2 * 11/2021 ............. G06F 3/005

OTHER PUBLICATIONS

Combined Search and Examination Report under Sections 17 and 18(3) for Great Britain Application No. 2003349.4, mailed Nov. 30, 2020, 9 pages.

(Continued)

*Primary Examiner* — Jeffrey C Pwu
*Assistant Examiner* — Mayasa A. Shaawat
(74) *Attorney, Agent, or Firm* — EIP US LLP

(57) ABSTRACT

A computer implemented method to protect data input to a user input device from detection, the device including an artificial haptic feedback mechanism arranged to generate an occurrence of haptic feedback for sensing by a user of the device in response to each input gesture on the device by the user, wherein at least a subset of each occurrence of haptic feedback is adjusted with respect to a previous occurrence of haptic feedback by one or more of: a timing of the haptic feedback with respect to a time of occurrence of a corresponding input gesture; an adjustment to a duration of haptic feedback relative to a duration of the previous occurrence of haptic feedback; and a generation of one or more addition occurrences of haptic feedback.

6 Claims, 4 Drawing Sheets

(51) Int. Cl.
   *G06F 3/04886* (2022.01)
   *G06F 21/60* (2013.01)

(56) References Cited

U.S. PATENT DOCUMENTS

| | | |
|---|---|---|
| 10,509,627 B2 | 12/2019 | Abuelsaad et al. |
| 2007/0140505 A1 | 6/2007 | Tribble et al. |
| 2018/0341757 A1 | 11/2018 | Haque et al. |
| 2019/0064924 A1* | 2/2019 | Nocon .................... G06F 3/147 |
| 2019/0384431 A1* | 12/2019 | Berger ................ G06F 3/04886 |

OTHER PUBLICATIONS

Extended European Search Report for European Application No. 20161682.8, mailed on Sep. 16, 2020, 12 pages.

International Search Report and Written Opinion for Application No. PCT/EP2021/054386, mailed on Apr. 30, 2021, 13 pages.

Ling C., et al., "You Cannot Sense My PINs: A Side-Channel Attack Deterrent Solution Based on Haptic Feedback on Touch-Enabled Devices," 2016 IEEE Global Communications Conference (GLOBECOM), IEEE, Dec. 4, 2016, XP033059116, DOI: 10.1109/GLOCOM.2016.7842394, [retrieved on Feb. 2, 2017], pp. 1-7.

Simon L., et al., "Don't Interrupt Me While I Type: Inferring Text Entered Through Gesture Typing on Android Keyboards," Proceedings on Privacy Enhancing Technologies, 2016, vol. 3, pp. 136-154.

Simon L., et al., "PIN Skimmer," Security and Privacy in Smartphones & Mobile Devices, ACM, 2 Penn Plaza, Suite 701, Nov. 8, 2013, XP058034144, DOI: 10.1145/2516760.2516770, ISBN: 978-1-4503-2491-5, pp. 67-78.

Smith-Creasey M., et al., "A Novel Word-Independent Gesture-Typing Continuous Authentication Scheme for Mobile Devices," Computers & Security, vol. 83. 2019, 11 pages.

* cited by examiner

DATA INTERCEPTION PROTECTION

PRIORITY CLAIM

The present application is a National Phase entry of PCT Application No. PCT/EP2021/054386, filed Feb. 23, 2021, which claims priority from GB Patent Application No. 2003349.4, filed Mar. 6, 2020, each of which is hereby fully incorporated herein by reference.

TECHNICAL FIELD

The present disclosure relates to protection against interception of data. In particular it relates to the interception of data input to a device.

BACKGROUND

Data entry on computing devices such as smartphone, tablet, laptop or other devices can include the entry of secret, confidential, private or other sensitive information, Such data is susceptible to interception by third parties such as malicious parties during a data input process.

SUMMARY

Accordingly, it is desirable to provide protections against data interception during a data input process.

According to a first aspect of the present disclosure, there is provided a computer implemented method to protect data input to a user input device from detection, the device including an artificial haptic feedback mechanism arranged to generate an occurrence of haptic feedback for sensing by a user of the device in response to each input gesture on the device by the user, characterized in that at least a subset of each occurrence of haptic feedback is adjusted with respect to a previous occurrence of haptic feedback by one or more of: a timing of the haptic feedback with respect to a time of occurrence of a corresponding input gesture; an adjustment to a duration of haptic feedback relative to a duration of the previous occurrence of haptic feedback; and a generation of one or more addition occurrences of haptic feedback.

In some embodiments, the user device is a touchscreen device, each input gesture includes a swipe gesture for input of data via a soft keyboard, and the haptic feedback includes a vibration of the device.

In some embodiments, the adjustment to a timing of the haptic feedback includes one or more of: synchronizing the haptic feedback for an input gesture with a synchronization reference other than the input gesture itself; and adding a delay between the detection of the input gesture and the generation of the haptic feedback.

In some embodiments, the synchronization reference is a linear time scale.

In some embodiments, the adjustment to a duration of haptic feedback includes one or more of: a prolongation of the haptic feedback for a duration exceeding the previous occurrence of haptic feedback; a reduction in a duration of the haptic feedback to a duration below the previous occurrence of the haptic feedback.

In some embodiments, the adjustment of the haptic feedback is performed responsive to a determination that an occurrence of haptic feedback and a previous occurrence of haptic feedback correspond to the same input gesture.

According to a second aspect of the present disclosure, there is provided a computer system including a processor and memory storing computer program code for performing the method set out above.

According to a third aspect of the present disclosure, there is provided a computer program element comprising computer program code to, when loaded into a computer system and executed thereon, cause the computer to perform the method as described above.

BRIEF DESCRIPTION OF THE DRAWINGS

Embodiments of the present disclosure will now be described, by way of example only, with reference to the accompanying drawings, in which.

DETAILED DESCRIPTION

Figure 1:
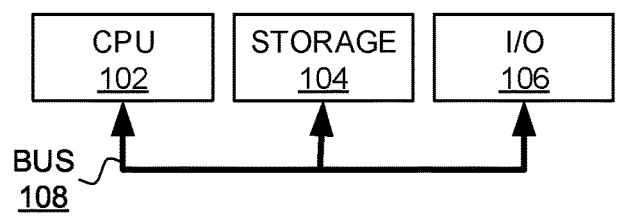
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Surprisingly, a touch-based or contact-based computing input device such as a finger or stylus input device including, for example, inter alia, a smartphone touchscreen, a tablet touchscreen, a computer touchscreen, a tablet digitizer, a touchpad or the like, is vulnerable to the interception of data input to a computing device. In particular, an artificial haptic-feedback (or response) interface provided by an input device such as a vibration response can yield vibration effects and, in some cases, corresponding sound effects arising from the vibration. Furthermore, patterns of such effects, corresponding to data input. For example, a so-called "soft keyboard" as a virtualized keyboard indicated on a touchscreen for the input of data by a user can provide a vibration and, in some cases, a sound response to user gestures including keypresses and swipes. Thus, haptics include mechanisms that convey a sense of touch to users. Haptic technology is a common design element that provides useful feedback to users that input has been successfully entered. Haptic feedback for gesture-typing is common, for example as a small vibration when the user first places their finger or pointing device on a screen to begin a word. Haptic feedback is usually implemented as motor vibration. Such responses to user gestures are susceptible to eavesdropping by, for example, other devices located within a range of the input device suitable to detect the responses to user gestures, either by detecting the vibration or sound resulting from the vibration.

The surprising vulnerability of such haptic responses in such input devices is confirmable by experimentation. For example, one experiment involves employing smartphone devices such as a "Moto G5S Plus (XT1803)" and a "Samsung Galaxy S10e" where the devices are placed on the same table in close proximity. An application such as a "notepad" is executed on a first one of the devices, allowing user data input by typing on a soft keyboard of the first device including a haptic response feature. A second one of the devices is configured to execute an audio recording application. A user inputs data such as sentences on the first device while it is sat flat on the table whilst the second device, also sat flat on the table and within a suitable distance of the first device, performs an audio recording of each sentence. The sentences used are shown in Table 1. For efficiency, due to audio files such as audio data encoded as waveform (WAV) files having a high sampling rate, signals can be down-sampled to use, for example, every 100th value in the signal. Notably, while audio recording is used in this example, vibration detection can alternatively be used.

TABLE 1

| ID | Sentence | Words |
|---|---|---|
| 1 | The quick brown fox jumped over the lazy dog | 9 |
| 2 | The pin for my card is 1234 | 10 |
| 3 | The temperature in the house is too hot | 8 |
| 4 | In London April is a spring month | 7 |
| 5 | Could I have chocolate on my cappuccino | 7 |
| 6 | Computer security conferences are the best | 6 |
| 7 | The lazy fox jumped over the quick brown dog | 9 |
| 8 | In summer I like to go strawberry picking | 8 |
| 9 | My car leaks so the rain gets in and makes it wet | 12 |
| 10 | The Caribbean has a great climate for a holiday | 9 |

Dynamic Time Warping (DTW) is an algorithm that can be used to classify time series data where sequences may be of different lengths or contain unique events but at different times in the series. For example, DTW is suitable for identifying similar samples of audio by warping the dimension of time such that each event in one sequence is mapped to an event in another sequence that yields a shortest distance between the two sequences. This is achieved through the construction of a two-dimensional matrix used to store the accumulated distance of the event-to-event comparisons. Each individual distance between two sequence events i and k can be computed as $d_i, k = |i-k|$. This result in N×M matrix of distance values for two sequences s1 and s2 of lengths N and M. An accumulated cost for each event-to-event mapping can be represented in the matrix by the minimum of $(i-1, k)+d_i, k$, $(i, k-1)+d_i, k$ and $(i-1, k-1)+d_i, k$. The time complexity for a DTW comparison is O(NM).

A first experiment can assess a feasibility of an attack based on detecting audio from a haptic response in a scenario, and also to establish a suitable number of sentence samples for in a dataset for accurate sentence classification. For example, the experiment is performed using all 10 sentences from Table 1. From ten to twenty samples are provided for each sentence. For each number of sentence samples, Nsamp, Nsamp-fold cross-validation is performed where one sample is held out for testing and the remaining samples from all sentences used for training. A test sample is compared to all training samples using DTW. If the test sample is matched to a training sample of the same sentence, then it is recorded as a match. A final accuracy is computed as a portion of correctly matched sentences.

Figure 2:
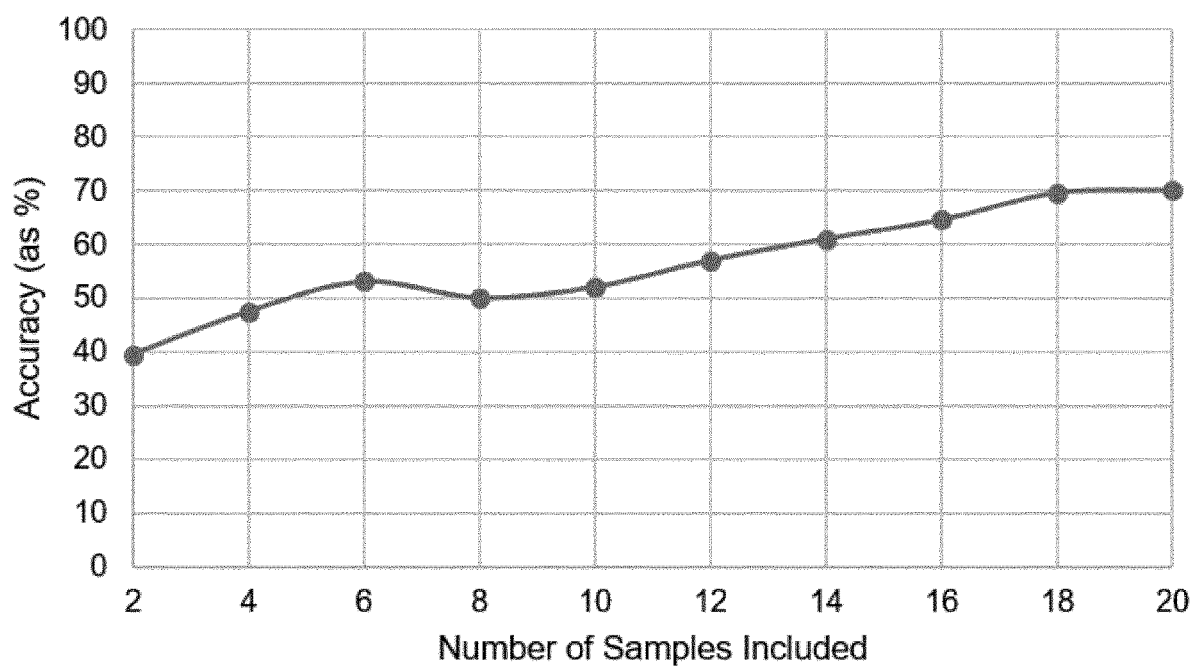
FIG. 2 shows a graph of a number of training samples (Nsamp) included in a training set against a measure of accuracy according to an exemplary experiment for demonstrating the efficacy of the surprising vulnerability as a means for attack.
Figure 3:
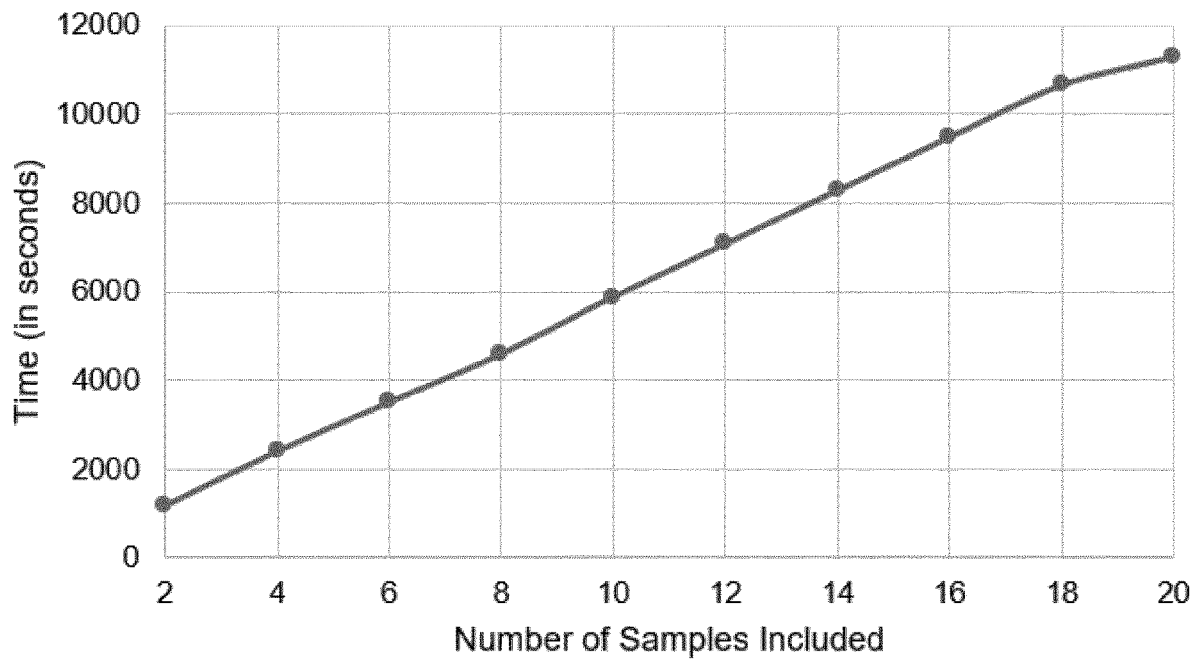
FIG. 3 shows a graph of a number of training samples (Nsamp) included in a training set against a measure of time taken to process each training set according to an exemplary experiment for demonstrating the efficacy of the surprising vulnerability as a means for attack.

A number of samples for each sentence, Nsamp, is varied from 2 to 20 in increments of 2 to assess the effect of a larger training set and to find an optimal number of training samples. For all comparisons for all sentence samples in the dataset, a computation time is recorded to identify any patterns. Results of such an exemplary experiment are shown in FIGS. 2 and 3. FIG. 2 shows a graph of a number of training samples (Nsamp) included in a training set against a measure of accuracy according to the exemplary experiment for demonstrating the efficacy of the surprising vulnerability as a means for attack. From FIG. 2 it can be seen that a generally greater number of sentence samples used in the training set results in a more accurate sentence identification. When all 20 sentences are used an accuracy of 70% is achieved.

FIG. 3 shows a graph of a number of training samples (Nsamp) included in a training set against a measure of time taken to process each training set according to the exemplary experiment for demonstrating the efficacy of the surprising vulnerability as a means for attack. FIG. 3 shows the time taken to process each training set for each variation of Nsamp when the training process is executed on a single thread of a ThinkPad P52 laptop with an Intel Core i7-8750H CPU and 24 GB of RAM. As shown by FIG. 3, by the figure, using all sentences also takes a greatest amount of time to process but the increase is time is substantially linear.

Figure 4:
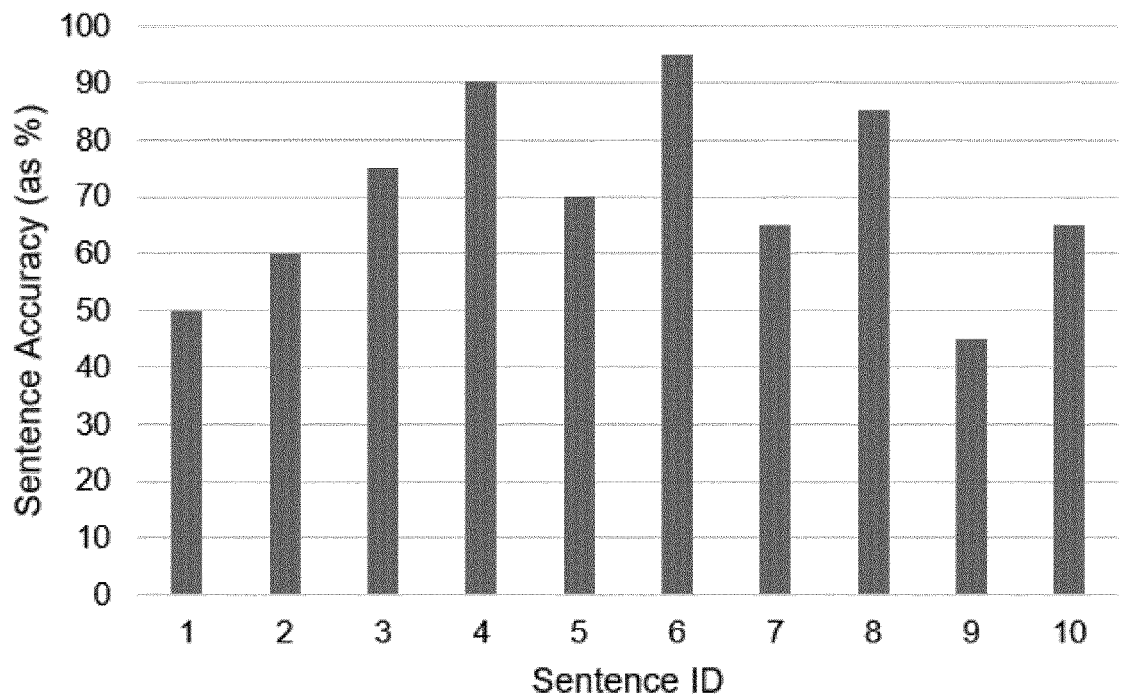
FIG. 4 shows a bar graph indicating a sentence match accuracy for each of a set of example sentences according to an exemplary experiment for demonstrating the efficacy of the surprising vulnerability as a means for attack.

A further experiment explores the results at a greater level of granularity using the approach providing a most accurate result from the previous experiment, where all other sentence samples are used for comparison. A number of matches and non-matches for each sentence are recorded and the accuracy is computed as before. FIG. 4 shows a bar graph indicating a sentence match accuracy for each of a set of example sentences according to the exemplary experiment for demonstrating the efficacy of the surprising vulnerability as a means for attack. It can be seen from FIG. 4 that different sentences are matched with differing degrees of accuracy. A most accurately matched sentence was sentence ID 6 (see Table 1) at 95%. This may be due to it having a unique number of very distinct words of varying length compared to other sentences.

Figure 5:
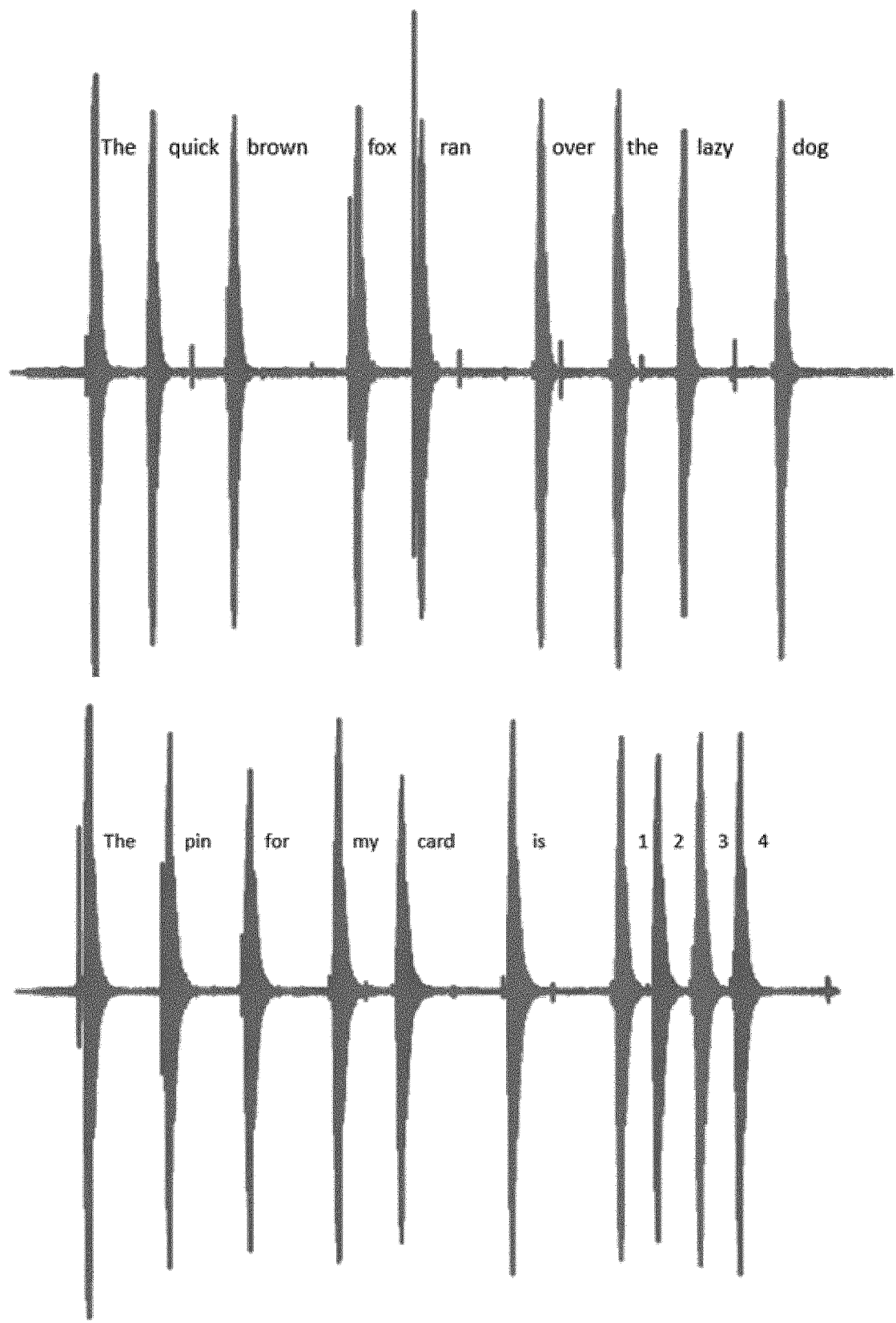
FIG. 5 depicts audio wave signals emanating from a first device based on haptic feedback by the first device to data input by a user, the audio wave signals being record by an audio recorder of a second device according to an exemplary experiment for demonstrating the efficacy of the surprising vulnerability as a means for attack.

FIG. 5 depicts audio wave signals emanating from a first device based on haptic feedback by the first device to data input by a user, the audio wave signals being record by an audio recorder of a second device according to an exemplary experiment for demonstrating the efficacy of the surprising vulnerability as a means for attack. It can be seen how different input sentences generate different patterns of haptic feedback resulting in different signals detected by the second device. Such signals can be classified, either as a whole or on a per-word basis, based on training data to identify similar, consistent and/or matching signals as part of a data interception attack.

The results of these experiments demonstrate that it is possible to perform an eavesdropping attack against systems using input devices such as soft keyboards having haptic response facilities based entirely on emanations from the haptic mechanisms, such as audio or vibration. This has significant consequences for operational security of such devices and input means. The position of a vulnerable device has an impact on the ability to detect emanations. A device laid on a flat, solid surface such as a desk leads to resonant sound through the surface allowing for detection by an attacker device in contact with the same surface. Similarly, a typing style of a user and features such as fingernail length can improve the ability to capture, and the accuracy of, signals.

Such an attack can be scaled and the identification of sentence fragments using, for example, the high-fidelity capture of audio or vibration emanations would enable large-scale surveillance utilizing this side-channel. Classification of intercepted audio or vibration signals can also be performed using, for example, a machine learning classifier or any suitable classification technique. Using such an approach, a likelihood of detecting and retrieving haptic feedback in, for example, a noisy environment can be improved.

Embodiments of the present disclosure seek to protect against such vulnerabilities. In particular, embodiments of the present disclosure provide for the adjustment of haptic feedback so as to protect against interception of data based on the haptic feedback.

Figure 6:
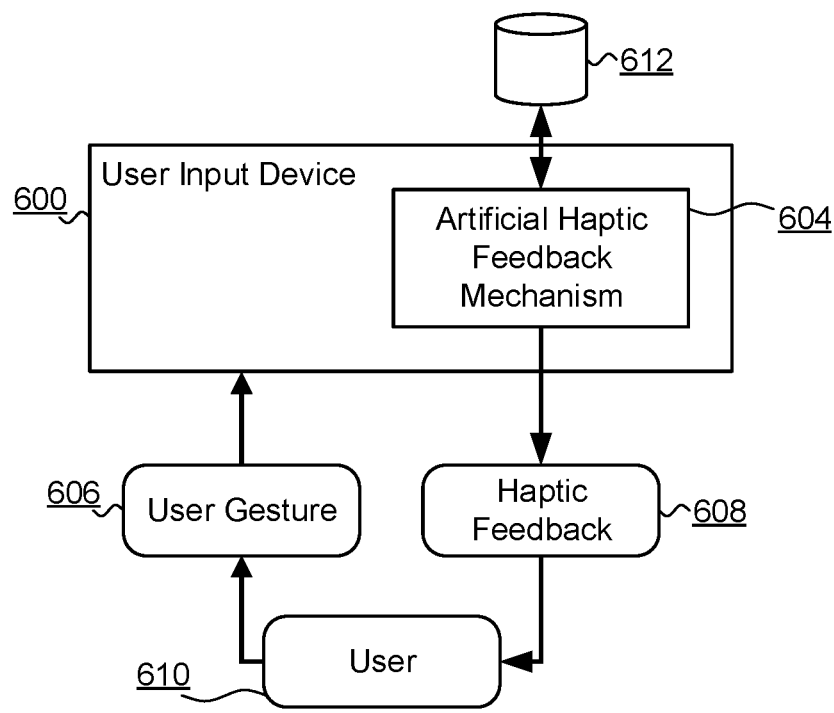
FIG. 6 is a component diagram of an arrangement for protecting user input to a user input device including an artificial haptic feedback mechanism in accordance with embodiments of the present disclosure.

FIG. 6 is a component diagram of an arrangement for protecting user input to a user input device 600 including an artificial haptic feedback mechanism 604 in accordance with embodiments of the present disclosure. A user input device 600 is a device including a touch-based, contact-based or pointer based input device such as a finger or stylus input device, a controller or a force-feedback input device including, for example, inter alia, a smartphone touchscreen, a tablet touchscreen, a computer touchscreen, a tablet digitizer, a touchpad, virtual reality controller, pointing device such as a mouse or trackpad with force feedback, or the like. Notably, the user input device 600 can include a device such as a computer system incorporating such a user interface facility, such as a smartphone including a touch screen. Associated with the user input device 600 is an artificial haptic feedback mechanism 604 including a device for generating haptic feedback 608 that can be sensed by a user 610 of the device 600 in use. For example, the artificial haptic feedback mechanism 604 includes a vibrating device such as a motorized vibrating device for generating vibrations for sensing by a user 610 of the device 600, such as vibrations detectable by a user's finger touching a device or by a user's hand holding a device. Notably, the artificial haptic feedback mechanism 604 may additionally generate sound—whether intentionally or as a side-effect of generating the artificial haptic feedback 608. The haptic feedback 608 is artificially generated in that it is generated for sensing by a user 610 of the device 600 where otherwise the device 600 would not provide such haptic feedback in normal use.

In use, the artificial haptic feedback mechanism 604 generates haptic feedback 608 in response to user gestures 606 received by the input device 600. User gestures can include touch and/or stylus gestures such as pointing, indicating, swiping, whether using single finger or stylus, or multiple fingers, a palm or other suitable gesture means. Further, gestures 606 can include indicating or pointing via a pointing device such as a virtual reality controller or other suitable controller means.

The artificial haptic feedback mechanism 604 is further adapted to record information relating to at least a subset of haptic feedback 608 generated thereby to a data store 612 such as a memory or storage device accessible to the feedback mechanism 604. Notably, the data store 612 may be local to the user input device 600 or may be provided remote to the device 600 such as by way of network, cloud or remote storage means. In use, the artificial haptic feedback mechanism 604 stores information relating to generated haptic feedback for future reference as will be described below.

In use, the user input device 600 is arranged to protect data input to the device 600 by a user 610 by way of gestures 606. Such data input by the user 610 that results in a generation of haptic feedback 608 is susceptible to interception and/or detection using mechanisms such as those previously described. For example, other devices located proximate to the user input device 600 may detect and/or record signals emanating from haptic feedback 608 such as sounds or vibration signals. Such signals can be interpreted to determine input data structures such as sentences, words, keypresses, values and the like, or characteristics thereof. In particular, in one embodiment, the user gesture 606 is a user swipe gesture on a soft keyboard such as a soft keyboard providing for the input of a word by a user swiping between letters on a visual representation of a keyboard, pausing at each letter in the word, such letters and/or the entire word being accompanied by the generation of haptic feedback 608. In such an embodiment, the timing, frequency and/or pattern of haptic feedback 608 occurrences can be used to infer user data or characteristics of user data input by way of such user gestures 606. For example, such inferences can be made with reference to a trained classifier such as a machine learning classifier or the like.

Embodiments of the present disclosure provide a protection of user input data against such interception and/or detection by adjusting at least a subset of each occurrence of haptic feedback 608 generated by the artificial haptic feedback mechanism 604 such that a signal generated based on the haptic feedback 608 has a reduced susceptibility to classification and/or interpretation for inferring user input data or characteristics thereof.

In particular, at least a subset of each occurrence of haptic feedback is adjusted with respect to a previous occurrence of haptic feedback. Such previous occurrence(s) of haptic feedback can be stored in the data store 612, such as by storing a type, nature, duration, timing, frequency, or other characteristic(s) of haptic feedback in the data store 612. Thus, in use, the artificial haptic feedback mechanism 604 can determine at least a subset of previous occurrences of haptic feedback 608 from the data store 612 and make an adjustment to a new haptic feedback generation, the adjustment being made with respect to a previous occurrence of haptic feedback.

For example, haptic feedback can be adjusted with respect to a previous occurrence of haptic feedback by adjusting a timing of the haptic feedback 608 with respect to a time of occurrence of a corresponding input gesture 606. For effect, haptic feedback 608 is conventionally generated in direct response to a user gesture 606 so as to give a user 610 a most positive user experience. It is partly this direct correlation of the timing of haptic feedback and user gesture input that can correlate haptic feedback 608 to user input data so constituting a vulnerability to interception. Adjusting a timing of the haptic feedback to a timing that is different to a previous timing with respect to a time of occurrence of a user gesture 606 can thus serve to reduce the correlation, and obfuscate the user input in any intercepted haptic signal. For example, whereas a previous haptic feedback may be timed to occur in immediate response to a user gesture 606, a subsequent haptic feedback may be offset with respect to the occurrence of a user gesture 606 such as by the introduction of a delay of determined or random duration. Such delay is preferably short such that a user is not distracted by a lack of synchronization of the haptic feedback and the user gesture, such as a delay of less than 500 milliseconds.

In an alternative embodiment, the adjustment to the timing of the haptic feedback 608 can include an adjustment to the synchronization of the haptic feedback such that the haptic feedback is synchronized with a new synchronization reference. For example, as previously described, haptic feedback is conventionally synchronized with user gestures 606. In one embodiment, the timing of the haptic feedback 608 can be adjusted for at least a subset of haptic feedback to be synchronized with another temporal occurrence, such as by being synchronized with a linear time scale (e.g. haptic feedback occurring every fixed duration according to a predetermined duration while one or more user gestures 606 are detected). Thus, according to such an embodiment, at least a portion of haptic feedback 608 is synchronized differently so reducing a correlation between an occurrence of haptic feedback and user input data.

Additionally or alternatively, a duration of haptic feedback 608 can be adjusted relative to a duration of a previous occurrence of haptic feedback. Thus, haptic feedback 608 can be prolonged for a duration exceeding a previous occurrence of haptic feedback 608, or reduced in duration to a duration below a previous occurrence of the haptic feedback. Such changes to a duration of haptic feedback serve to reduce a correlation between an occurrence of haptic feedback and user input data.

Additionally or alternatively, multiple occurrences of haptic feedback can be generated in response to a user gesture 606 such that additional occurrences of haptic feedback are generated, being additional occurrences relative to a previous occurrence of haptic feedback. Such additional occurrences act as a type of "chaff" or superfluous haptic feedback, the purpose of which is only to mask, conceal or otherwise obfuscate user input data by reducing a correlation between an occurrence of haptic feedback and user input data. Preferably, such additional occurrences of haptic feedback do not follow any particular schedule or pattern so as to avoid such additional occurrences being readily filtered from a haptic signal.

In one embodiment, the adjustment of haptic feedback is performed responsive to a determination that an occurrence of haptic feedback and a previous occurrence of haptic feedback correspond to the same input gesture. Thus, two corresponding input gestures (such as gestures relating to the input of the same or similar data) cause the generation of different haptic feedback 608 so as to reduce a correlation between the occurrence of haptic feedback and user input data. Such similarity in input data can be detected by, for example, storing user input data along with corresponding haptic feedback information in the data store 612.

Figure 7:
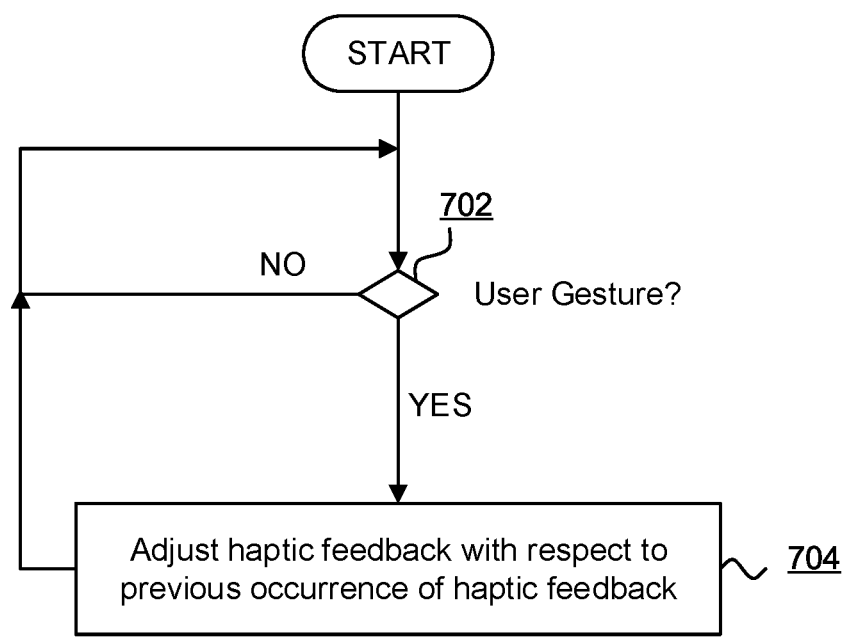
FIG. 7 is a flowchart of a method to protect user input to a user input device including an artificial haptic feedback mechanism in accordance with embodiments of the present disclosure.

FIG. 7 is a flowchart of a method to protect user input to a user input device including an artificial haptic feedback mechanism in accordance with embodiments of the present disclosure. The method loops at 702 to detect a user gesture 606. Responsive to the user gesture 606 the method generates haptic feedback 608 at 704 where the haptic feedback 608 is adjusted with respect to a previous occurrence of haptic feedback, such as previously described.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk, etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to protect data input to a user input device from detection, the user input device including an artificial haptic feedback mechanism arranged to generate an occurrence of haptic feedback for sensing by the user of the user input device in response to each input gesture on the user input device by the user, the method comprising:

adjusting at least a subset of each occurrence of haptic feedback with respect to a previous occurrence of haptic feedback by one or more of:
a timing of the haptic feedback with respect to a time of occurrence of a corresponding input gesture including one or more of: synchronizing the haptic feedback for an input gesture with a synchronization reference other than the input gesture itself, or adding a delay between the detection of the input gesture and the generation of the haptic feedback;
an adjustment to a duration of haptic feedback relative to a duration of the previous occurrence of haptic feedback including one or more of: a prolongation of the haptic feedback for a duration exceeding the previous occurrence of haptic feedback, or a reduction in a duration of the haptic feedback to a duration below the previous occurrence of the haptic feedback; and a generation of one or more additional occurrences of haptic feedback.

2. The method of claim 1, wherein the user input device is a touchscreen device, each input gesture includes a swipe gesture for input of data via a soft keyboard, and the haptic feedback includes a vibration of the user input device.

3. The method of claim 1, wherein the synchronization reference is a linear time scale.

4. The method of claim 1, wherein the adjustment of the haptic feedback is performed responsive to a determination that an occurrence of haptic feedback and a previous occurrence of haptic feedback correspond to the same input gesture.

5. A computer system comprising:

a processor and memory storing computer program code for protecting data input to a user input device from detection, the user input device including an artificial haptic feedback mechanism arranged to generate an occurrence of haptic feedback for sensing by the user of the user input device in response to each input gesture on the user input device by the user, by:

adjusting at least a subset of each occurrence of haptic feedback with respect to a previous occurrence of haptic feedback by one or more of: a timing of the haptic feedback with respect to a time of occurrence of a corresponding input gesture including one or more of: synchronizing the haptic feedback for an input gesture with a synchronization reference other than the input gesture itself, or adding a delay between the detection of the input gesture and the generation of the haptic feedback; an adjustment to a duration of haptic feedback relative to a duration of the previous occurrence of haptic feedback including one or more of: a prolongation of the haptic feedback for a duration exceeding the previous occurrence of haptic feedback, or a reduction in a duration of the haptic feedback to a duration below the previous occurrence of the haptic feedback; and a generation of one or more addition occurrences of haptic feedback.

6. A non-transitory computer-readable storage medium storing computer program code to, when loaded into a computer system and executed thereon, cause the computer system to protect data input to a user input device from detection, the user input device including an artificial haptic feedback mechanism arranged to generate an occurrence of haptic feedback for sensing by the user of the user input device in response to each input gesture on the user input device by the user, by:

adjusting at least a subset of each occurrence of haptic feedback with respect to a previous occurrence of haptic feedback by one or more of: a timing of the haptic feedback with respect to a time of occurrence of a corresponding input gesture including one or more of: synchronizing the haptic feedback for an input gesture with a synchronization reference other than the input gesture itself, or adding a delay between the detection of the input gesture and the generation of the haptic feedback; an adjustment to a duration of haptic feedback relative to a duration of the previous occurrence of haptic feedback including one or more of: a prolongation of the haptic feedback for a duration exceeding the previous occurrence of haptic feedback, or a reduction in a duration of the haptic feedback to a duration below the previous occurrence of the haptic feedback; and a generation of one or more addition occurrences of haptic feedback.

* * * * *